US005991978A

United States Patent [19]

Nussbaum

[11] Patent Number: 5,991,978

[45] Date of Patent: Nov. 30, 1999

[54] BAR FOR ATTACHING A WATCH WRISTLET AND WATCH FITTED WITH SUCH A BAR

[75] Inventor: Augustin Nussbaum, Neuchâtel, Switzerland

[73] Assignee: SMH Management Services AG, Biel, Switzerland

[21] Appl. No.: 09/030,234

[22] Filed: Feb. 25, 1998

[30] Foreign Application Priority Data

Feb. 26, 1997 [EP] European Pat. Off. .............. 97103103

[51] Int. Cl.[6] ............................... G04B 37/16; F16B 7/00

[52] U.S. Cl. ..................... 24/265 B; 24/453; 24/265 WS

[58] Field of Search .......................... 24/265 B, 265 WS, 24/453; 368/282; 63/21, 22, 3.1

[56] References Cited

U.S. PATENT DOCUMENTS 1,700,992 2/1929 Augenstein .
4,217,681 8/1980 Grohoski et al. ................. 24/265 B X
4,285,450 8/1981 Barnes .............................. 24/265 B X
4,564,308 1/1986 Ikegami et al. ................... 24/265 B X
5,048,393 9/1991 Grabner et al. ...................... 24/453 X
5,199,733 4/1993 DeLorme .............................. 24/453 X
5,517,734 5/1996 Korpi ....................................... 24/453
5,689,867 11/1997 Katz ............................. 24/265 WS X

FOREIGN PATENT DOCUMENTS 81 387 12/1963 France .

*Primary Examiner*—James R. Brittain
*Assistant Examiner*—Robert J. Sandy
*Attorney, Agent, or Firm*—Griffin, Butler, Whisenhunt & Szipl

[57] ABSTRACT

Bar (6) for attaching a watch wristlet (4) intended to be engaged by sliding into a passage (12, 14) of a watch case (2) and inserted in one of the ends of a wristlet (4), the bar (6) including an elongated body (22) and including a locking device, the locking device including a lock (28) subject to the action of a resilient element (30) and a control (32, 36) for controlling the lock (28) which is accessible from one end of the bar (6), the lock being arranged so as to project in a transverse direction with respect to the body (22) outside the body of the bar (6), in a first position (FIG. 1) in which the control (32, 36) is not actuated, and to retract inside the body (22), in a second position (FIG. 2) when the control (32, 36) is actuated.

21 Claims, 2 Drawing Sheets

BAR FOR ATTACHING A WATCH WRISTLET AND WATCH FITTED WITH SUCH A BAR

Figure 1:
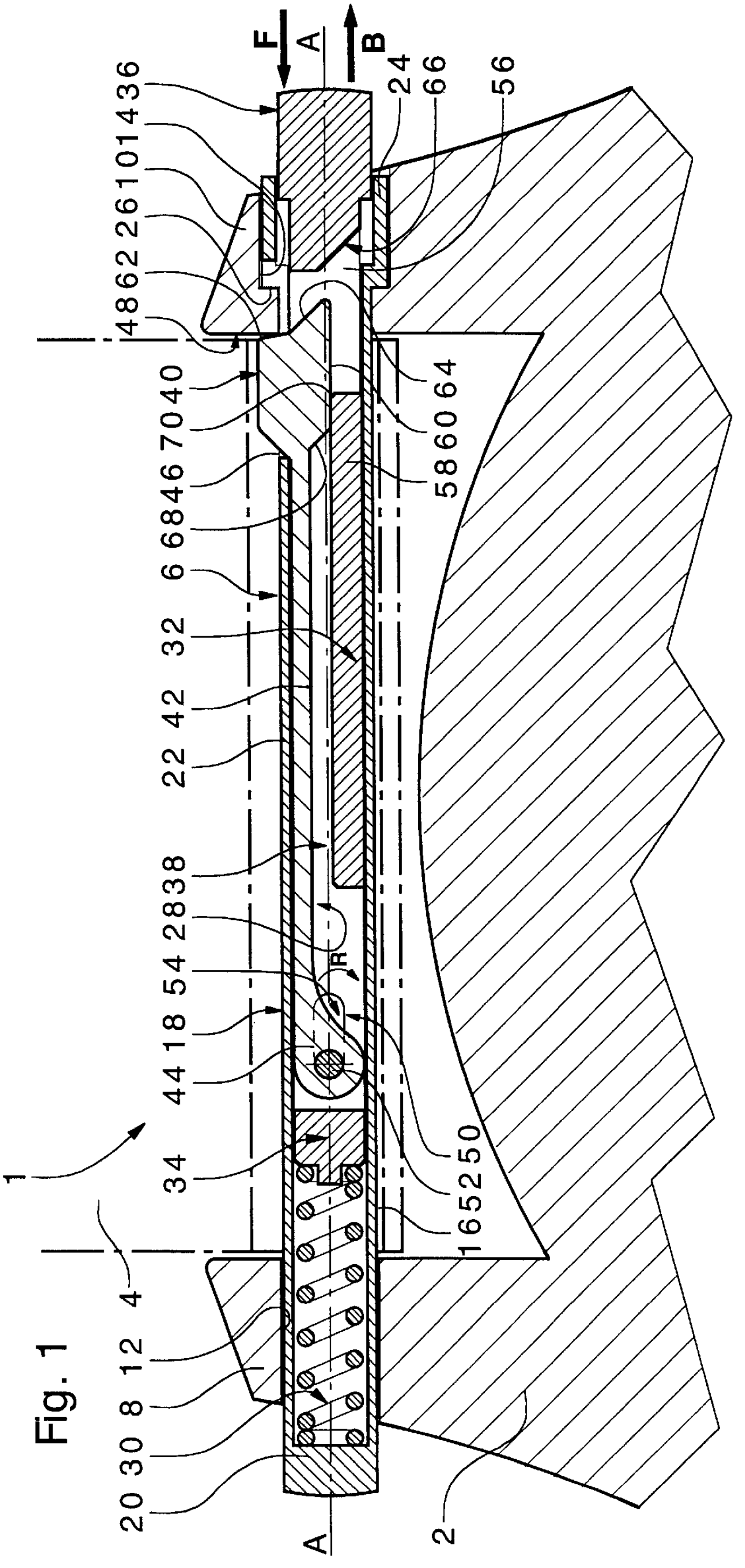

The present invention concerns a bar for rapidly attaching a watch wristlet and more particularly a bar of this type for attaching a wristlet to the horns or attachment portions of a watch case, this device allowing in particular the wristlet to be interchanged simply without risking damaging the case and/or the wristlet.

The present invention also concerns a watch fitted with a bar of the type defined hereinbefore.

Generally, watch wristlets are fixed onto watch cases with horns by means of bars onto which the strands of the wristlet are attached, the ends of the bars being fixed to the horns of the watch case. The most commonly used bars include two pivots at their ends. Generally, the pivots are mobile within a central tube and are subjected to the action of a spring housed within the tube which pushes them outwards, the horns being respectively fitted with holes in which the bar pivots enter.

Such a system for attaching the wristlet to the case has the drawback of requiring generally the intervention of a specialist for detaching the wristlet when the latter has to be replaced by another one. Further, this detaching operation is performed with the aid of a tool, for example tweezers or a knife, which risks damaging the watch case. This system is consequently not very satisfactory and does not meet current market requirements which demand wristlet attaching devices allowing the users easily to replace their wristlet themselves by another. It is for example useful to be able to transform a classic watch into a diver's watch worn over a wetsuit, and for which it is thus necessary to fit a wristlet of greater length bought as an accessory. One may also wish at any time of the day to adapt the type of wristwatch to the circumstances and thus to be able to change the wristlet easily oneself, for example to have a wristlet matching the colour of one's clothes.

A solution consisting of fitting the mobile pivot of the bar with a manipulation catch able to be actuated without the aid of a tool to detach the wristlet has already been proposed in Patent Application WO 94/14105.

This solution is however unsatisfactory since it is limited to conventional leather wristlets, but requires a wristlet including an additional cut in the eyelets accommodating the bars. Furthermore, the attaching and detaching of the wristlet requires in particular the mobile pivot of the bar to be put into the hole of the horn while keeping it pushed into the tube of the bar with the nail via the catch. Again, this operation requires a certain dexterity and consequently cannot be implemented by all users. Moreover, this operation requires the user to exert a relatively large force on the catch risking hurting himself, or even breaking the nail.

The main object of the invention is thus to overcome the drawbacks of the aforementioned prior art by providing a bar for rapidly attaching a watch wristlet, which is secure and inexpensive, which can be easily implemented by the user and which may be adapted to any kind of wristlet and which does not affect negatively the overall aesthetic of the watch.

The invention therefore concerns a bar for attaching a watch wristlet intended to be engaged by sliding into a passage of a watch case and inserted in one of the ends of a wristlet, said bar including an elongated body and being characterised in that it includes a locking device, said locking device including a lock subjected to the action of a resilient element and means for controlling said lock which are accessible from one end of the bar, said lock being arranged so as to project in a transverse direction with respect to said body, outside said body of said bar, in a first position in which the control means are not actuated, and to retract inside said body, in a second position when the control means are actuated.

Thus, the user can easily detach or attach his wristlet onto a watch case, for example with a view to changing it, simply by actuating the control means to release the lock from complementary means arranged on the case, and to withdraw the bar laterally by a simple sliding movement parallel to its longitudinal axis. This operation has the significant advantage of being able to be performed without needing a specialist and without any tool.

According to an advantageous feature of the invention, the control means include a control stem mounted so as to slide relative to said body, a first end of the control stem being associated with actuating means and a second end being associated with said lock, said resilient element acting directly on said control stem.

According to another advantageous feature, said lock is formed of an elongated element including a hooking portion which projects from said elongated body in said first position, and said elongated element is hinged with respect to the control stem.

The invention also concerns a watch including a bar of the type described hereinbefore.

Figure 2:
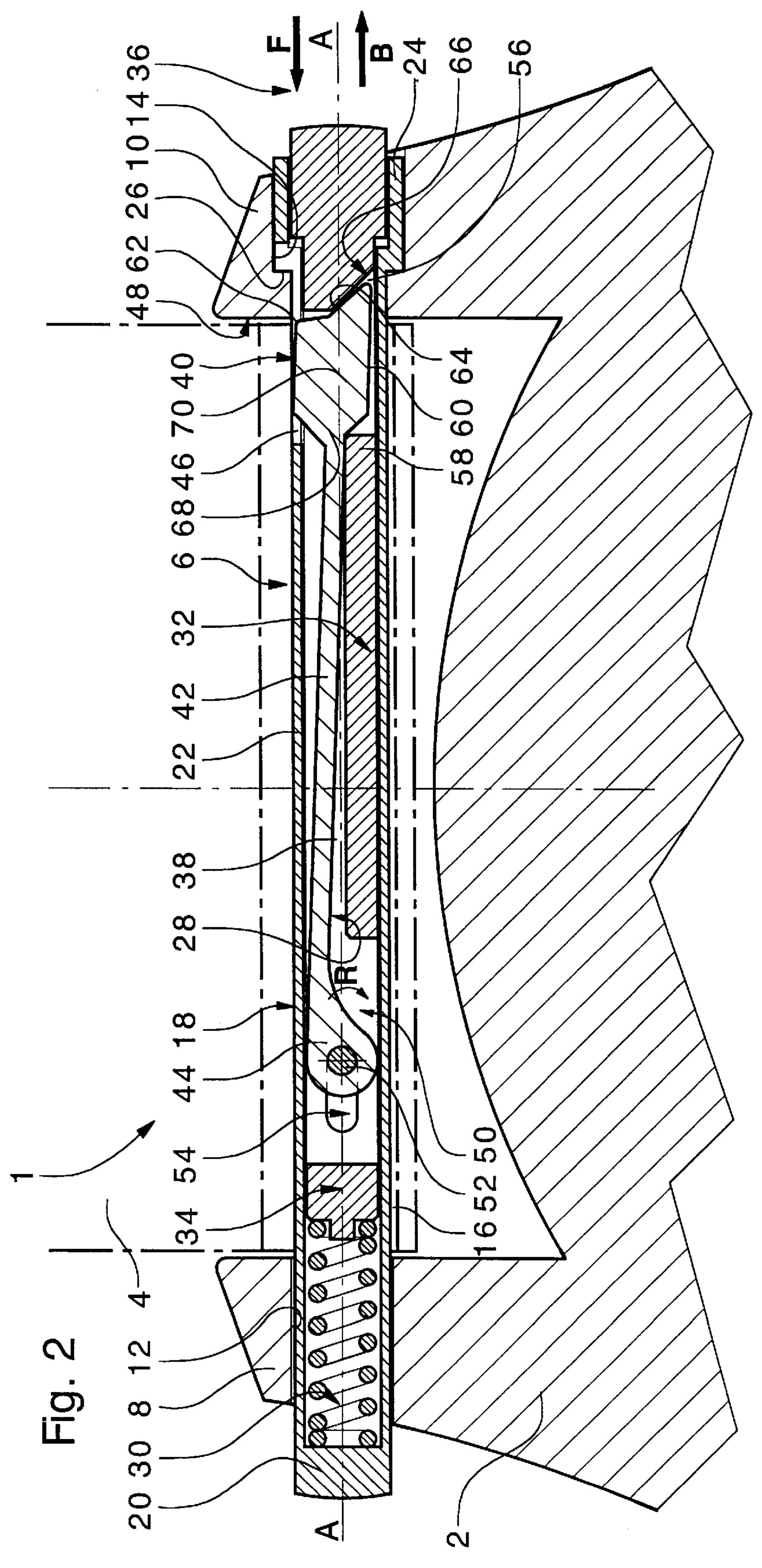

Other features and advantages of the invention will appear more clearly upon reading the following description of an embodiment of the invention given purely by way of illustrative and non limiting example, this description being made in conjunction with the drawings in which:

FIG. 1 is a longitudinal cross-section of an embodiment of a bar for attaching a wristlet onto a watch case according to the invention, the lock of the locking device being shown in a first position called the working position, said bar being mounted on the horns of a watch case, and FIG. 2 is a similar cross-section to that shown in FIG. 1 in which the lock is shown in a second position called the retracted position.

FIGS. 1 and 2 show a partial view of a wristwatch shown partially in cross-section and designated by the general reference 1. Wristwatch 1 includes a watch case 2 onto which one end of a wristlet 4 is hinged via an attachment bar 6.

The term "wristlet" in this context includes any type of wristlet able to be attached to the case via bars to hold the watch in position on the wrist of a user and includes not only leather or plastic wristlets, but also metal wristlets, for example with links.

Case 2 includes in a conventional manner a middle part having with two pairs of horns for attaching wristlet 4 of which only horns 8 and 10 of one pair are shown in the drawing. The two pairs of horns are placed, in a conventional manner, on opposite sides of the middle part, at 12 o'clock and 6 o'clock.

Within the context of the invention, "horns" shall be understood to mean any element of various shapes, used to attach the wristlet onto the watch case. These horns may follow the general shape of the middle part, but not necessarily. It will be noted that attachment elements which are only slightly attached to the middle part or not at all, or which are even added onto the case, are also included in this general definition of horns.

For purposes of simplification, bar 6 will only be described in connection with the attachment of a strand or end of wristlet 4 to a pair of horns 8 and 10, the bar for attaching the wristlet to the other pair of horns being made in an identical manner.

The end of wristlet 4, shown in dot and dash lines, is associated with attachment bar 6 via which it is fixed to horns 8 and 10. Bar 6 is engaged, on the one hand, in a passage formed by two openings 12 and 14 perpendicular to the longitudinal direction of the wristlet and arranged respectively in horns 8 and 10 and, on the other hand, in an eyelet 16 provided at the end of wristlet 4, the end of the wristlet extending in the space separating horns 8 and 10.

According to the invention, bar 6 includes an elongated body 18 formed in the example shown by a tube closed at one of its ends by a base or bottom 20.

Tube 20 includes a first portion 22 having a first diameter followed by a second portion 24 of a second diameter greater than the first and delimited by a shoulder 26. Portion 22 extends substantially between horns 8 and 10 and portion 24 extends into opening 14 which has a corresponding shape.

Bar 6 further comprises a locking device which locks bar 6 onto horns 8 and 10.

This locking device includes a lock 28 subjected to the action of a resilient element 30 and means 32 for controlling the lock. Control means 32 include a control stem which extends within tube 22 and which is mounted so as to slide with respect to the latter.

In the example shown, resilient element 30 acts upon lock 28 via control stem 32, resilient element 30 extending between base 20 of tube and one end 34 of stem 32. This resilient element 30 is formed by a helical spring which acts directly upon control stem 32 to push it outwards from tube 20. It will be noted in this respect that end 34 comprises a centring tip (not referenced) for spring 30.

The opposite end of stem 32 projects outside tube 22. This end has the shape of a push-button 36 which forms means for actuating stem 32. The stem control means are thus accessible from outside the tube.

End 34 is associated with the locking device which is arranged so that lock 28 projects in a transverse direction with respect to the longitudinal axis A—A of tube 22 and outside the latter in a first position called the working position, shown in FIG. 1, when control stem 32 is not actuated, and to retract completely within tube 22 in a second position called the retracted position, shown in FIG. 2, when control stem 30 is actuated by push-button 36.

In the embodiment described, lock 28 is formed of an elongated element which is housed in a recess 38 arranged in stem 32 and in which it may retract completely. Lock 28 includes, at one free end (on the right of the drawings), a hooking portion 40 connected, via an elongated median portion 42, to a hinging portion 44 situated at its opposite end.

Hooking portion 40 projects through an oblong opening 46 arranged for this purpose in tube 22, when control stem 32 is in the working position. This hooking portion 40 abuts complementary means formed, in the example shown, by one of the walls 48 of the horns situated opposite, to block longitudinally bar 6 in passages 12 and 14 and to assure the attachment of wristlet 4.

Hinging portion 44 extends into a first housing 50 provided at one end of recess 38 and is hinged with respect to stem 32 on a pin 52 fixed to tube 22. Pin 52 extends perpendicular to axis A—A of the tube and passes through two oblong openings 54 (only one of which is visible in the drawing) arranged facing one or other in lateral walls of stem 32, said openings opening into first housing 50 and extending parallel to axis A—A.

A second housing 56 provided in recess 38, accommodates hooking portion 40 when stem 32 is in the second position. This second housing 56 is situated facing oblong opening 46 provided in tube 22 so that hooking portion 40 can project outside tube 22 in the first position (FIG. 1).

A shoulder 58 which extends between first housing 50 and second housing 56 is also provided so that lock 28, in particular hooking portion 40, is blocked by said shoulder when lock 28 is in the working position (FIG. 1).

In the example described, hooking portion 40 has a general polygonal convex shape in longitudinal cross-section including in particular a flat base 60 via which it rests on shoulder 58 in the first position.

This hooking portion also includes in its distal part a holding face 62 which extends substantially perpendicular to median portion 42 and which abuts wall 48 under the action of spring 30 in the working position. Face 62 is extended via a sliding or cam face 64 which is inclined with respect to axis A—A. Face 64 forms an angle β with axis A—A which is between 20° and 80° and preferably of the order of 45°. Face 64 allows lock 28 to be brought into the retracted position (FIG. 2) by sliding said face 54 on a wall 66 of second housing 56 when one acts upon control stem 32 via actuating means 38. Said wall 66 includes a shape corresponding to that of the distal of hooking portion 40, namely a portion substantially perpendicular to axis A—A and an inclined portion.

In its lower proximal part, i.e. the closest part to shoulder 58, hooking portion 40 has another sliding or cam face 68 substantially parallel to face 64. Said face 68 allows lock 28 and more particularly hooking portion 40, to be brought into second housing 56 (in the second position) by sliding said face 68 against edge 70 of shoulder 58 when stem 32 is actuated. This allows lock 28 to retract completely into recess 38. Face 68 also allows shoulder 58 to push fixing portion 40 outside tube 22 when push-button 38 is released.

Thus, when push-button 36 is pressed, stem 32 moves with respect to lock 28 in the direction of arrow F while compressing spring 30 until pin 52 is stopped against the end walls of oblong openings 54. The movement of stem 32 with respect to lock 28 under the action of the push-button allows face 68 to come into contact with edge 70 of shoulder 58 and to slide on this edge towards the interior of second housing 56 via rotation of the lock in the direction of arrow R. Simultaneously, holding face 62 slides along the edge of opening 14 until cam 64 meets the inclined portion of wall 66 which forces hooking portion 40 to enter completely second housing 56. Thus, hooking portion 40 retracts completely within tube 22 and allows a lateral release of bar 6 from passages 12 and 14 to release wristlet 4.

When one stops acting upon actuating means 36, spring 30 returns control stem 32 in the direction of arrow B, causing edge 70 of shoulder 58 to slide on face 68 until hooking portion 40 enters opening 46 so that holding face 62 can abut internal wall 48 of horn 10.

What is claimed is:

1. A watch including a case and at least one bar for attaching a wristlet intended to be engaged by sliding into a passage of a watch case and inserted in one of the ends of a wristlet, said bar including an elongated body and including a locking device, said locking device including a lock subjected to the action of a resilient element and means for controlling said lock which are accessible from one end of the bar, said resilient element extending in the prolongation of said control means, said lock being formed of an elongated element including a hooking portion and being arranged so as to project in a transverse direction with respect to said body, with said hooking portion projecting outside said body of said bar, in a first position (FIG. 1) in which the control means are not actuated, and said lock being arranged to retract inside said body, in a second position (FIG. 2) when the control means are actuated.

2. A watch according to claim 1, wherein the control means include a control stem mounted so as to slide relative to said body, a first end of the control stem being associated with actuating means and a second end being associated with said lock, said resilient element acting longitudinally upon said control stem.

3. A watch according to claim 2, wherein said elongated element is hinged with respect to the control stem.

4. A watch according to claim 3, wherein the hooking portion includes in its distal part a holding face substantially perpendicular to said elongated element, said holding face being extended via a first sliding face which allows the lock to be brought into said second position (FIG. 2) by sliding against a portion of the control stem when the latter is actuated.

5. A watch according to claim 4, wherein said hooking portion has in its proximal part a second sliding face which allows the lock to be brought into said second position (FIG. 2) by sliding against an edge of said shoulder when said control stem is actuated.

6. A watch according to claim 5, wherein the first and second sliding faces are inclined and form an angle (β) of between 20 and 80 degrees with the longitudinal axis of the bar.

7. A watch according to claim 2, wherein said second end is hinged on a pin fixed to said body and wherein said pin passes through at least one oblong opening, which extends into the control stem parallel to the longitudinal axis (A—A) of the bar.

8. A watch according to claim 2, wherein said control stem includes a recess into which the lock may retract completely.

9. A watch according to claim 8, wherein said recess includes a first housing into which extends one end of said elongated element and a second housing into which extends said hooking portion when the control stem is in said second position (FIG. 2), a shoulder being provided between said first and second housings, on which said hooking portion can rest in said first position (FIG. 1).

10. A watch according to claim 9, wherein the hooking portion includes a base face via which it is intended to rest on the shoulder in the first position (FIG. 1).

11. A watch according to claim 2, wherein said elongated body is formed by a tube.

12. A watch according to claim 11, wherein said tube includes an oblong opening through which said hooking portion of said lock extends in said first position (FIG. 1).

13. A watch according to claim 11, wherein said tube includes a base and in that said resilient element extends between said base and an end of the control stem.

14. A watch according to claim 2, wherein said actuating means include a button integral with said control stem and emerging from an open end of the body of the bar in said first position.

15. A bar for attaching a watch wristlet intended to be engaged by sliding into a passage of a watch case and inserted in one of the ends of a wristlet, said bar including an elongated body and including a locking device, said locking device including a lock subjected to the action of a resilient element and means for controlling said lock which are accessible from one end of the bar, said resilient element extending in the prolongation of said control means, said lock being formed of an elongated element including a hooking portion and being arranged so as to project in a transverse direction with respect to said body, with said hooking portion projecting outside said body of said bar, in a first position (FIG. 1) in which the control means are not actuated, and said lock being arranged to retract inside said body, in a second position (FIG. 2) when the control means are actuated, the control means including a control stem mounted so as to slide relative to said body, a first end of the control stem being associated with actuating means and a second end being associated with said lock, said resilient element acting longitudinally upon said control stem, said second end being hinged on a pin fixed to said body and said pin passing through at least one oblong opening, which extends into the control stem parallel to the longitudinal axis (A—A) of the bar.

16. A bar according to claim 15, wherein said control stem includes a recess into which the lock may retract completely.

17. A bar according to claim 16, wherein said recess includes a first housing into which extends one end of said elongated element and a second housing into which extends said hooking portion when the control stem is in said second position (FIG. 2), a shoulder being provided between the first and second housings, on which said hooking portion can rest in said first position (FIG. 1).

18. A bar for attaching a watch wristlet intended to be engaged by sliding into a passage of a watch case and inserted in one of the ends of a wristlet, said bar including an elongated body and including a locking device, said locking device including a lock subjected to the action of a resilient element and means for controlling said lock which are accessible from one end of the bar, said resilient element extending in the prolongation of said control means, said lock being formed of an elongated element including a hooking portion and being arranged so as to project in a transverse direction with respect to said body, with said hooking portion projecting outside said body of said bar, in a first position (FIG. 1) in which the control means are not actuated, and said lock being arranged to retract inside said body, in a second position (FIG. 2) when the control means are actuated, said elongated body being formed by a tube including an oblong opening through which said hooking portion of said lock extends in said first position (FIG. 1).

19. A bar for attaching a watch wristlet intended to be engaged by sliding into a passage of a watch case and inserted in one of the ends of a wristlet, said bar including an elongated body and including a locking device, said locking device including a lock subjected to the action of a resilient element and means for controlling said lock which are accessible from one end of the bar, said resilient element extending in the prolongation of said control means, said lock being formed of an elongated element including a hooking portion and being arranged so as to project in a transverse direction with respect to said body, with said hooking portion projecting outside said body of said bar, in a first position (FIG. 1) in which the control means are not actuated, and said lock being arranged to retract inside said body, in a second position (FIG. 2) when the control means are actuated, said elongated element being hinged with respect to the control stem, the hooking portion including in its distal part a holding face substantially perpendicular to said elongated element, said holding face being extended via a first sliding face which allows the lock to be brought into said second position (FIG. 2) by sliding against a portion of the control stem when the latter is actuated.

20. A bar according to claim 19, wherein said hooking portion has in its proximal part a second sliding face which allows the lock to be brought into said second position (FIG. 2) by sliding against an edge of said shoulder when said control stem is actuated.

21. A bar according to claim 20, wherein the first and second sliding faces are inclined and form an angle (β) of between 20 and 80 degrees with the longitudinal axis of the bar.

* * * * *